United States Patent [19]

Itoh

[11] Patent Number: 4,632,573
[45] Date of Patent: Dec. 30, 1986

[54] LINEAR MOTION BALL BEARING

[75] Inventor: Katsutoshi Itoh, Yamatotakada, Japan

[73] Assignee: Tsubakimoto Precision Products Co., Ltd., Osaka, Japan

[21] Appl. No.: 804,653

[22] PCT Filed: Apr. 5, 1985

[86] PCT No.: PCT/JP85/00173

§ 371 Date: Nov. 13, 1985

§ 102(e) Date: Nov. 13, 1985

[87] PCT Pub. No.: WO86/02417

PCT Pub. Date: Apr. 24, 1986

[30] Foreign Application Priority Data

Oct. 11, 1984 [JP] Japan .................. 59-211514

[51] Int. Cl.⁴ .............................................. F16C 31/06
[52] U.S. Cl. .......................................... 384/43; 384/45
[58] Field of Search .............................. 308/6 C, 6 R; 384/43–45

[56] References Cited

U.S. PATENT DOCUMENTS 3,304,133 2/1967 Strassberg ...................... 308/6 C
3,467,447 9/1969 Newman ........................ 308/6 C
3,758,176 9/1973 Stapley .......................... 308/6 C
3,845,993 11/1974 Schiler .......................... 308/6 C
4,547,025 10/1985 Isert ............................. 308/6 C

FOREIGN PATENT DOCUMENTS 40-20483 7/1965 Japan .
54-43225 12/1979 Japan .

Primary Examiner—Stuart S. Levy
Assistant Examiner—Thomas R. Hannon
Attorney, Agent, or Firm—Howson and Howson

[57] ABSTRACT

A linear motion ball bearing used for guiding portions which perform a linear motion such as a machine tool table, a positioning table, etc., the linear motion ball bearing including upper and lower members (1, 1') each having opposed C-shaped grooves (1a) and an intermediate member (2) having upper and lower opposed C-shaped grooves (2a) and upper and lower grooves (2a') for connecting the end portion of the C-shaped grooves, the upper, lower and intermediate members (1, 1', 2) being fitted laminately on a leg portion (3a) of a bearing body (3) to form a ball circulation path, thereby attaining easiness of machining and reduction of the number of parts.

1 Claim, 10 Drawing Figures

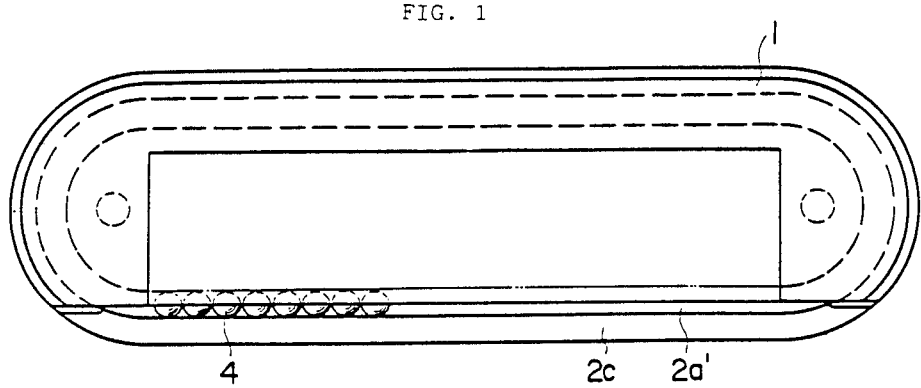
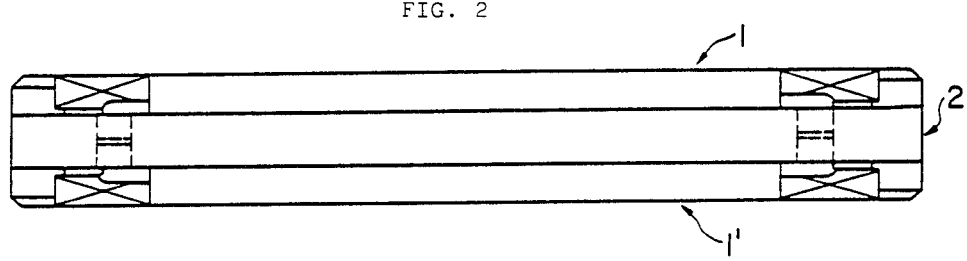
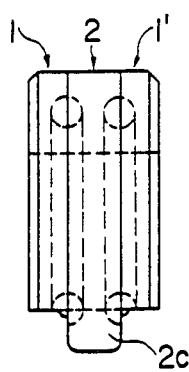

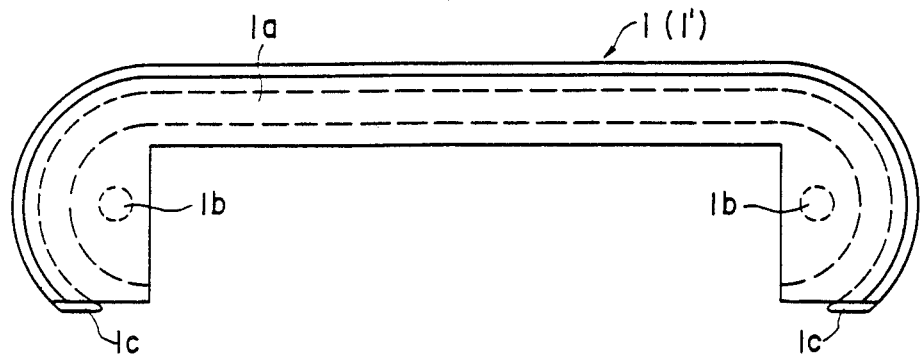
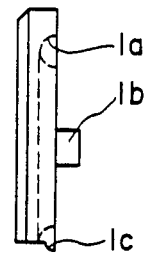
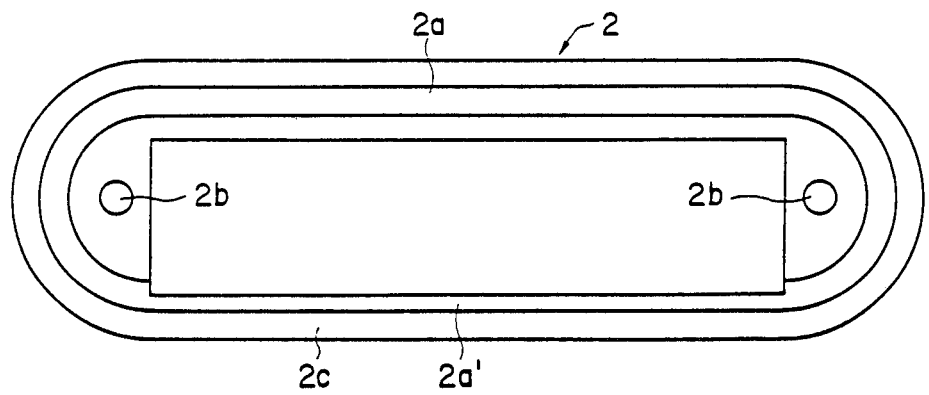

LINEAR MOTION BALL BEARING

FIELD OF ART

The present invention relates to a linear motion ball bearing used for guiding portions which perform a linear motion such as a machine tool table, a positioning table, etc.

BACKGROUND ART

According to a conventional linear motion ball bearing of this type, generally a ball return hole is formed axially in a bearing body to let balls circulate in an axial direction, and a machining for curved surface is performed to connect end portions of the return hole and a loaded ball groove formed in the bearing body, and further a return cap having a ball turning groove for changing the direction of ball by 180° is applied to each end portion. Besides, in order to prevent balls from falling off when the bearing body is pulled out from a rail base, it is necessary to provide a ball retainer separately.

It has been proposed to use a side face of a bearing body as part of a ball return hole in place of forming a ball return hole axially in the bearing body, as disclosed in Japanese Patent Laid-Open Publication No. 58225/84. Even in this proposed construction, however, it is still necessary that each end portion of the ball return hole and a loaded ball groove formed in the bearing body be covered with a return cap having a ball turning groove. Besides, a separate provision of a ball retainer is also required as before.

Thus, these conventional techniques are disadvantageous in that the number of parts increases and troublesome machinings are required.

DISCLOSURE OF THE INVENTION

The present invention is characterized by upper and lower members each having opposed C-shaped grooves and an intermediate member having upper and lower opposed grooves including C-shaped portions cooperating with the grooves in the upper and lower members to provide C-shaped ball circulation paths, and connecting portions of approximately quarter-circular cross section, for connecting end portions of the C-shaped grooves. The upper, lower and intermediate members are fitted laminatedly on a leg portion of a bearing body which has loaded ball grooves formed therein.

The thus laminatedly fitted upper, lower and intermediate members form an endless ball circulation path conjointly with the loaded ball grooves formed in the leg portion of the bearing body. Consequently, it it not necessary to form a ball return hole in the bearing body, nor is it necessary to perform a curved surface machining for changing the direction of ball. Further, it is not necessary to separately provide a return cap for changing the direction of ball at each bearing end portion.

Besides, the grooves formed in the intermediate member for connecting end portions of the C-shaped grooves fulfill the function as a ball retainer which holds balls between it and the loaded ball grooves formed in the bearing body, thus preventing balls from falling off even when the bearing body is pulled out from a rail base.

Consequently, not only the number of parts is reduced but also it becomes no longer necessary to form a ball return hole in the bearing body or perform a machining for curved surface at the ball inlet/outlet portion, and hence the manufacturing cost is reduced.

Further, by forming the ball direction changing portion in the shape of an ideal arc of a large diameter, the resistance of ball against direction changing is greatly reduced. In addition, by applying a resin coating into the grooves of the upper, lower and intermediate members, it is made possible to render the balls easier to slip and reduce noise.

Also in the manufacturing process, the assembly becomes extremely easy, and it is possible to fabricate the upper, lower and intermediate members according to a precision casting or forging, or by plastics. Also from this point it is possible to reduce the manufacturing cost.

BRIEF DESCRIPTION OF THE DRAWINGS

FIGS. 1 to 3 are top, front and side views, respectively, showing upper and lower members and an intermediate member as assembled with respect to a bearing body, FIGS. 4 and 5 are top and side views, respectively, of the upper and lower members, FIG. 6 is a top view of the intermediate member.

BEST FORM FOR PRACTICING THE INVENTION

Figure 7:
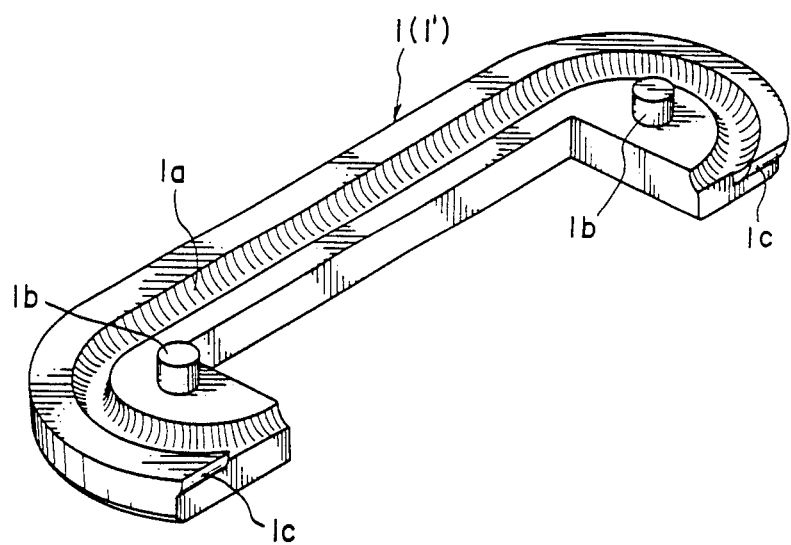
FIG. 7 is a perspective view of the upper and lower members (as viewed from the back of the members in FIG. 4)

An embodiment of the present invention will be described below with reference to the accompanying drawings, in which FIGS. 1 to 3 illustrate upper and lower members and an intermediate member put one upon another in a laminated fashion with respect to a bearing body, as viewed from three directions. Upper and lower members 1 and 1' are of just the same shape as shown in FIGS. 4, 5 and 7.

The upper and lower members are each formed with opposed C-shaped grooves 1a having a generally semi-circular section. The reference numeral 1b denotes a guide pin for positioning by fitting it in a hole 2b of an intermediate member 2 as will be described later, and the numeral 1c denotes a ball scooping pawl.

Figure 8:
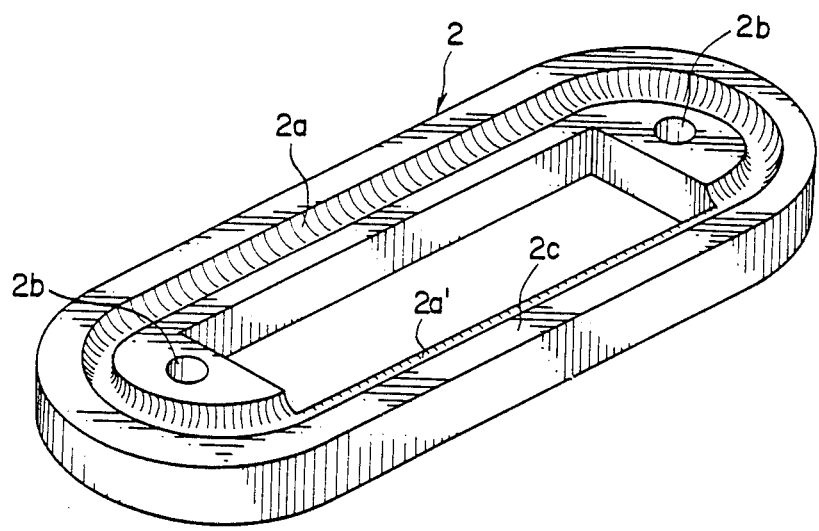
FIG. 8 is a perspective view of the intermediate member.

On the other hand, as fully shown in FIGS. 6 and 8, the intermediate member 2 is formed with upper and lower opposed C-shaped grooves 2a of a shape complementing the opposed C-shaped grooves 1a of the upper and lower members 1 and 1', and also formed with upper and lower grooves 2a' for connecting end portions of the C-shaped grooves. The opposed C-shaped grooves 2a are of a semicircular section which forms a circle in complement with the corresponding grooves of the upper and lower members. The groove 2a' of the connection is of a section having approximately a quarter of a circle.

The numeral 2b denotes a guide hole for fitting therein of the guide pin 1b of the upper and lower members.

Figure 9:
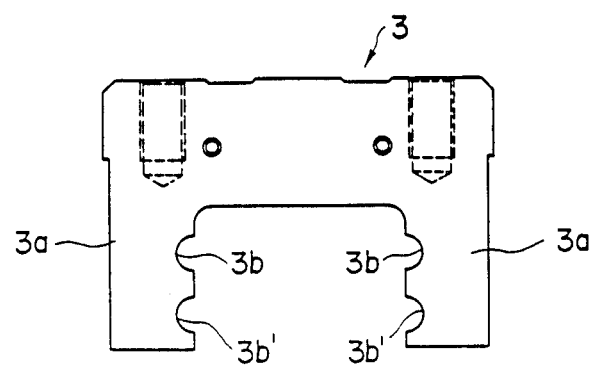
FIG. 9 is a front view of the bearing body.

In assembling, the upper and lower members 1, 1' and the intermediate member 2 are fitted on a leg portion 3a of a bearing body 3 shown in FIG. 9 and are brought into contact with end faces of loaded ball grooves 3b and 3b' to form an endless circulation path of balls.

For incorporation of balls, the bearing body 3 is turned upside down and put on an assembly jig, then the upper member 1 having opposed C-shaped grooves is fitted on the leg portion 3a so that the grooves face upward, then balls 4 (see FIG. 1) are put therein, thereafter the intermediate member 2 is put thereon and balls are put therein, then the lower member 1' having opposed C-shaped grooves is put thereon, and thereafter a cover (not shown) having a groove of a shape conforming to the shape of an end portion after lamination of the upper and lower members and intermediate member is bolted to each end portion of the bearing body 3. This is all that is required for incorporation of balls. Thus, the assembly can be done in a very simple manner.

Figure 10:
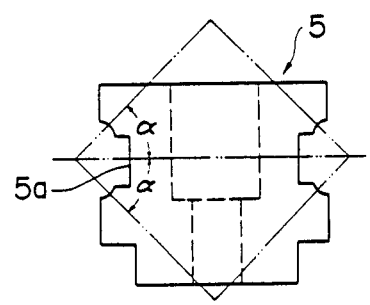
FIG. 10 is a front view of a rail base.

A portion 2c of the intermediate member 2 in which is formed the groove 2a' for connecting the end portions of the C-shaped grooves, extends along a groove 5a of a rail base 5 shown in FIG. 10. In an assembled state, the balls 4 are each exposed only about one quarter so are held between the groove 2a' and the loaded ball groove 3b or 3b' of the bearing body 3 when the bearing body 3 is pulled out from the rail base 5. Thus, the portion 2c functions as a ball retainer. The ball direction changing portion is formed in an arcuate shape of a large diameter as shown in FIG. 1 whereby the resistance against a direction change of balls can be reduced to a remarkable extent.

Application of the device of the present invention is not limited to such a symmetric bearing shape as shown in FIG. 9. A linear motion ball bearing may be constituted by forming an only one-side bearing body portion having a ball circulation mechanism and a rail base separately as unit type modules and bolting these modules to other machine parts (e.g. table and bed of a machine tool). It goes without saying the ball groove may be formed in a circular shape to receive load equally in four directions. In this case, an angle of contact, $\alpha$, between the rail base and ball shown in FIG. 10 is set at about 45° relative to the horizontal direction.

Although the upper, lower and intermediate members shown each have a semicircular end portion, their end portions may be rectangular, for example.

I claim:

1. A linear motion ball bearing comprising:

upper and lower generally C-shaped members each having a generally C-shaped groove of approximately semi-circular cross-section formed in one face thereof, the C-shaped groove comprising a return path and two reversing paths, one adjacent to each end of the return path, each reversing path having an end connected to the adjacent end of the return path, and an opposite end, said opposite ends of the reversing paths being opposed to each other, and each C-shaped member having a gap between said opposed ends of the reversing paths of its grooves, the gap being adapted to receiving a leg portion of a bearing body, and the grooved faces of the upper and lower C-shaped members facing and being spaced from each other;

an intermediate member located between the upper and lower members, said intermediate member having upper and lower grooved faces, a portion of the groove in each face being generally C-shaped and semi-circular in cross-section, and confronting the generally C-shaped groove of one of the upper and lower members to provide a substantially enclosed generally C-shaped ball circulation path of circular cross-section, the intermediate member also having a portion of the groove in each of its faces connecting the ends of the C-shaped groove portion in each face, said connecting portion having an approximately quarter-circular cross-section, and the intermediate member having a central opening surrounded by said grooves in the upper and lower grooved faces thereof, said opening being adapted to receive a leg portion of a bearing body; and a bearing body extending through said opening of the intermediate member and being received in the gaps of the upper and lower members, said bearing body having load-bearing, ball-receiving grooves;

the quarter-circular portions of the grooves in the intermediate member being opposed to the grooves of the bearing body, whereby balls in said load bearing grooves are retained therein by said quarter-circular groove portions.

* * * * *